United States Patent
Arndt et al.

(10) Patent No.: US 9,044,710 B2
(45) Date of Patent: Jun. 2, 2015

(54) METHOD FOR PRECIPITATING MERCURY FROM FLUE GASES OF HIGH-TEMPERATURE PLANTS

(75) Inventors: Richard Arndt, Liblar (DE); Josef Hueter, Cologne (DE); Jurgen Wirling, Hurth (DE)

(73) Assignee: Rheinbraun Brennstoff GmbH, Koln (DE)

( * ) Notice: Subject to any disclaimer, the term of this patent is extended or adjusted under 35 U.S.C. 154(b) by 0 days.

(21) Appl. No.: 14/123,466

(22) PCT Filed: Apr. 18, 2012

(86) PCT No.: PCT/EP2012/001672
§ 371 (c)(1),
(2), (4) Date: Feb. 24, 2014

(87) PCT Pub. No.: WO2012/163450
PCT Pub. Date: Dec. 6, 2012

(65) Prior Publication Data
US 2014/0308185 A1    Oct. 16, 2014

(30) Foreign Application Priority Data
Jun. 1, 2011 (DE) .......................... 10 2011 103 829

(51) Int. Cl.
*B01D 53/64* (2006.01)
(52) U.S. Cl.
CPC .......... *B01D 53/64* (2013.01); *B01D 2251/108* (2013.01); *B01D 2253/102* (2013.01); *B01D 2257/602* (2013.01)

(58) Field of Classification Search
CPC ........................................................ B01D 53/64
USPC ............................................. 95/134; 423/210
See application file for complete search history.

(56) References Cited

U.S. PATENT DOCUMENTS

| 6,808,692 B2 | 10/2004 | Oehr |
| 7,713,503 B2 | 5/2010 | Maly et al. |

(Continued)

FOREIGN PATENT DOCUMENTS

| DE | 4339777 A1 | 5/1995 | |
| DE | 199 36 930 A1 * | 2/2001 | ............. B01D 53/64 |

(Continued)

OTHER PUBLICATIONS

English language PCT International Search Report mailed Jun. 4, 2012, received in corresponding PCT Application No. PCT/EP12/01672, 3 pgs.

(Continued)

*Primary Examiner* — Timothy Vanoy
(74) *Attorney, Agent, or Firm* — Grossman Tucker Perreault & Pfleger, PLLC

(57) ABSTRACT

The invention relates to a process for separating mercury out of flue gases from high-temperature plants, especially from power plants and waste incineration plants, in which reactants, for example in the form of bromine or alkali metal sulfides, are added to the flue gas beyond the firing operation in flow direction and then the flue gas is subjected to at least one dry cleaning operation for removal of the mercury and any excess reactants, wherein it is a feature of the process that the reactants and carbonaceous adsorbents in the form of activated carbons and/or activated cokes are introduced to the flue gas stream with separate metered addition, and the reactants are metered into the flue gas stream as a function of a preferably constantly measured mercury concentration.

14 Claims, 2 Drawing Sheets

(56) References Cited

U.S. PATENT DOCUMENTS

Figure 1:
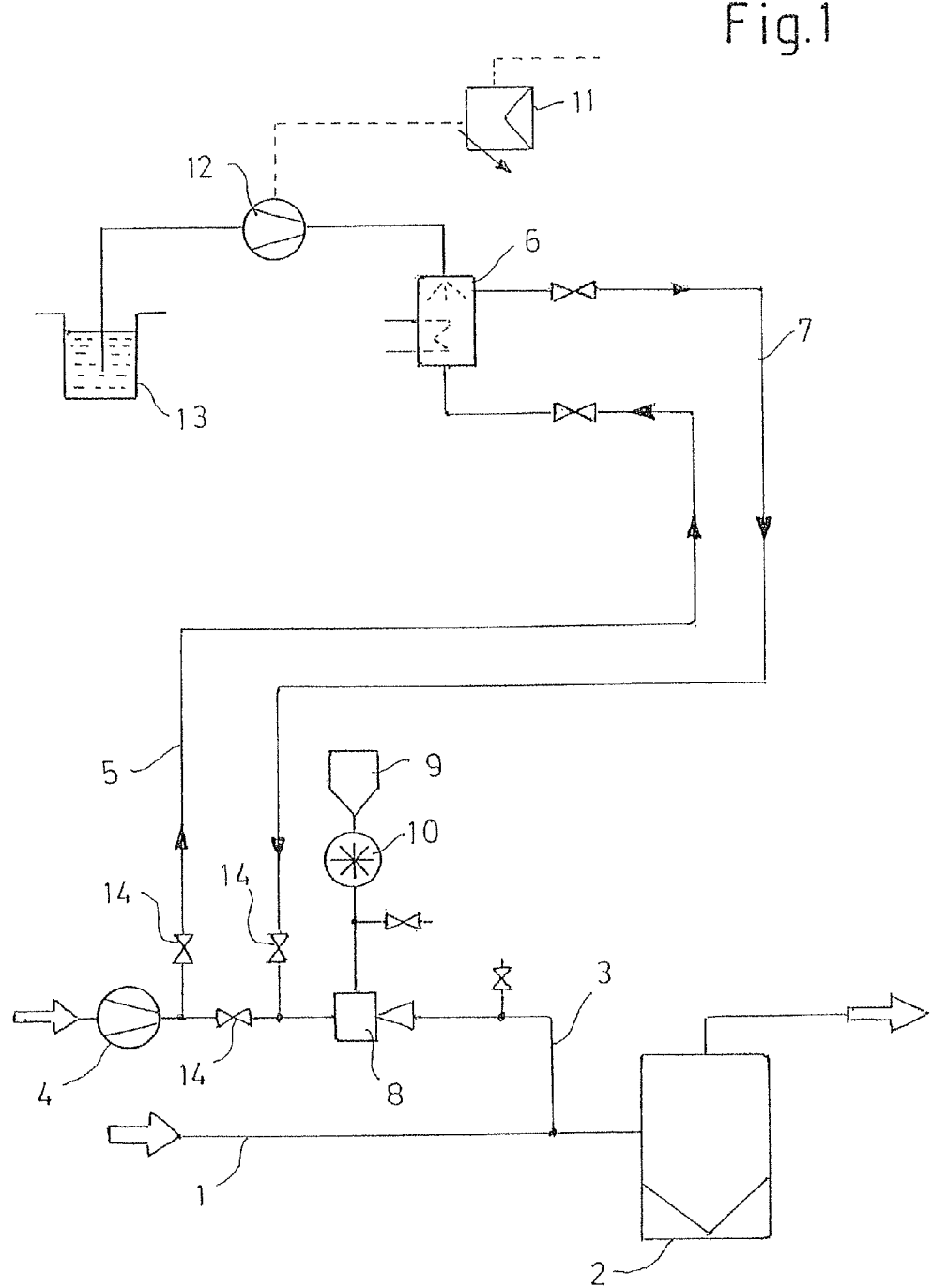

| | | | |
|---|---|---|---|
| 7,842,265 B1* | 11/2010 | Paone, III | 423/210 |
| 2004/0013589 A1 | 1/2004 | Vosteen et al. | |
| 2007/0140940 A1 | 6/2007 | Varma et al. | |
| 2007/0234902 A1 | 10/2007 | Fair et al. | |
| 2008/0134888 A1 | 6/2008 | Chao et al. | |
| 2009/0010828 A1 | 1/2009 | Holmes et al. | |
| 2009/0136401 A1 | 5/2009 | Yang et al. | |
| 2010/0031818 A1 | 2/2010 | Higgins et al. | |
| 2010/0199841 A1* | 8/2010 | Gadkaree et al. | 95/134 |
| 2012/0132073 A1* | 5/2012 | Johnson et al. | 95/134 |
| 2013/0272936 A1* | 10/2013 | Nalepa et al. | 423/210 |

FOREIGN PATENT DOCUMENTS

| | | |
|---|---|---|
| WO | 2007149867 A1 | 12/2007 |
| WO | 2009129298 A1 | 10/2009 |
| WO | 2010036752 A1 | 4/2010 |
| WO | 2011038415 A2 | 3/2011 |

OTHER PUBLICATIONS

English language Translation of PCT International Preliminary Report on Patentability mailed Jan. 12, 2013, received in corresponding PCT Application No. PCT/EP12/01672, 3 pgs.

German language PCT Written Opinion mailed Jun. 4, 2012, received in corresponding PCT Application No. PCT/EP12/01672, 5 pgs.

* cited by examiner

METHOD FOR PRECIPITATING MERCURY FROM FLUE GASES OF HIGH-TEMPERATURE PLANTS

The invention relates to a process for separating mercury out of flue gases from high-temperature plants, especially from power plants and waste incineration plants, in which bromine and/or bromine compounds and/or alkali metal sulfides or other sulfur compounds, for example sulfurous acid, especially sodium tetrasulfide, are added as reactants to the flue gas beyond the firing operation in flow direction, and then the flue gas is subjected to at least one dry cleaning operation for removal of the mercury and any excess reactants.

Mercury and mercury compounds are always present in organic and fossil fuels in greater or lesser amounts. Through increasing combustion of fossil fuels, more mercury is being mobilized and is accumulating in the biosphere. Because of the relatively high toxicity of mercury, especially of organically bonded mercury, which is ingested directly or indirectly via the food chain, even by man, there exist relatively strict limits for the legally permissible emissions of mercury, for example from incineration plants and power plants.

Even though, for example, power plants and offgas incineration plants and similar high-temperature plants operated in Germany already achieve comparatively low clean gas concentrations of mercury, mainly because of the wet scrubbing of flue gases practiced in Germany, there are continuing efforts, more particularly because of the high flue gas volume flows which carry considerable mercury burdens, to reduce mercury emissions.

In combustion plants and power plants, mercury is present essentially in two different forms, elemental mercury and oxidized divalent mercury. In contrast to the gaseous elemental mercury, gaseous oxidized mercury is water-soluble and can therefore be scrubbed out of the flue gas in a downstream flue gas cleaning plant. The oxidized form of mercury can also be separated out better than elemental mercury in a dry flue gas cleaning operation, for example by means of entrained flow adsorption.

The most common form of oxidized mercury is divalent mercury chloride. It is formed in what is called mercury chlorination in the cooling boiler flue gas. The chlorine in the boiler flue gas originates from the fuel (for example chlorides present in the coal). In the hot combustion space, HCl is at first formed, and is converted in the course of cooling to $Cl_2$ via the "Deacon reaction". However, in the presence of $SO_2$ which forms from the sulfur present in the fuel, this chlorine is converted back to HCl via the "Griffin reaction" and is thus not available for the oxidation of the mercury. Depending on the chlorine sulfur and mercury content in the fuel, a ratio of oxidized mercury to elemental mercury arises at the end of the boiler in an incineration plant. The higher the proportion of oxidized mercury, the simpler and better the separability of mercury in the downstream flue gas cleaning operation. What is desirable is thus maximum oxidation of the mercury.

In order to achieve this, it is known in principle that halogens, especially iodine or bromine, can be added to the incineration and/or the exhaust gas stream, thus reducing the concentration of elemental mercury in the gas stream.

A particularly suitable method for reducing the level of elemental mercury in the flue gas stream has been found to be "bromine-assisted mercury separation".

DE 102 33 173 B4 describes a process in which bromine and/or a bromine compound and/or a mixture of various bromine compounds is supplied in a multistage firing operation and/or to the flue gas in a plant part downstream of the firing operation, wherein the temperature on contact of the bromine compounds with the flue gas should be at least 500° C. and the incineration is effected in the presence of a sulfur compound, especially sulfur dioxide, with addition of sulfur and/or of a sulfur compound and/or of a mixture of various sulfur compounds. The flue gas is subsequently subjected to a wet scrubbing operation.

Similar processes for separation of mercury out of flue gases are known, for example, from US 2007/0234902 A1, US 2007/0140940 A1, U.S. Pat. No. 6,808,692 B2, DE 10 2007 042 297 A1, WO2007/149867 A1, US 2009/0136401 A1, US 2008/0134888 A1, and DE 43 39 777 A1. The aim of all the known processes is to achieve 100% oxidation of the mercury by the addition of reactants, for example of a bromine compound, with acceptance of excess metered addition.

This method of exhaust gas cleaning firstly does not take account of the fact that the reactants are comparatively expensive; secondly, most of the processes proceed from a wet exhaust gas cleaning operation, such that, for example, even the addition of bromine in excess relative to the mercury does not constitute a problem.

WO 2009/129298 A1 discloses a process for separating mercury out of flue gases from high-temperature plants, in which carbonaceous adsorbents and reactants in the form of chemically pretreated activated carbons are introduced into the flue gas beyond the firing operation in flow direction, with separate metered addition to the flue gas stream.

US 2010/0031818 A1 discloses a process for separating mercuries out of flue gases of a power plant vessel, in which a portion of the incompletely combusted ash is drawn off from the vessel, cooled and introduced into the flue gas stream upstream of a particulate filter unit. In one variant of the process described therein, it is envisaged that halogens or halogen precursors are introduced into the flue gas stream with separate metered addition. Alternatively, the incompletely combusted ash drawn off from the incineration can be exposed to a halogen-containing atmosphere over a certain period.

Document US 2007/0180990 A1 discloses a process for separation of mercury out of the flue gases of a steam generator, in which pulverulent activated carbons are metered into a reaction zone separately from a halogen-comprising compound, and the sorbents doped with the reactants in the reaction zone are introduced into the flue gas stream upstream of a solids separator.

Document WO 2010/036752 A1 discloses a process for removing mercury from flue gas using mixtures of carbonaceous substrates with brominated organic compounds.

It is therefore an object of the invention to improve a process of the type specified at the outset with regard to the adjustability thereof to varying exhaust gas composition and with regard to the field of use thereof. The process is also to be optimized in terms of cost.

The object is achieved by the features of claim 1; advantageous configurations of the process are apparent from the dependent claims.

In a process for separating mercury out of flue gases from high-temperature plants, especially from power plants and waste incineration plants, in which bromine and/or bromine compounds and/or alkali metal sulfides are added as reactants to the flue gas beyond the firing operation in flow direction, and then the flue gas is subjected to at least one dry cleaning operation to remove the mercury and any excess reactants, wherein it is envisaged in the process according to the invention that the reactants and carbonaceous adsorbents, preferably in the form of activated carbons and/or activated cokes, are introduced into the flue gas stream by separate metered addition, and that the reactants are metered into the flue gas stream as a function of a preferably constantly measured mercury concentration in the flue gas.

The carbonaceous adsorbents employed are preferably hearth furnace cokes.

"Separate metered addition" in the context of the present invention means that the activated carbon and the reactants are each measured/metered in by means of separate and separately functioning metering units. This does not mean, in any case, that the metered addition of the reactants is independent in the broadest sense from the metered addition of the activated carbon. There is primarily a dependence of the metered addition of the reactants on the mercury concentration measured in the flue gas stream, the mercury concentration being measured beyond a flue gas cleaning operation in flow direction.

Firstly, this gives rise to an advantageous combination of reactive and adsorptive mercury separation; secondly, the metered addition of the reactants as a function of a measured mercury concentration ensures that the addition of the reactants is as effective and inexpensive as possible. This ensures that no excess of reactants remains in the flue gas, which is undesirable especially when, for example, bromine or bromine compounds find use as reactants, these being known to have a certain toxicity.

In a preferred variant of the process according to the invention, it is envisaged that the reactants are contacted with the flue gas at a flue gas temperature between 80° C. and 490° C., preferably between 80° C. and 250° C.

According to the invention, an advantageous combination of bromine-assisted and adsorptive mercury separation is envisaged. In this context, it has been found that, contrary to what is described in the specialist media and in the prior art according to DE 102 33 173 B4, significant mercury bromination is already possible at temperatures well below 500° C.

The mechanism of action can be explained by the dissociation of the NaBr or $CaBr_2$ to bromide anions, which proceeds in the pore structure of the activated carbon and in the presence of steam at temperatures below 500° C. This is influenced significantly by the capillary structure of the activated carbon or of the hearth furnace coke, by virtue of which, in conjunction with the steam present in the atmosphere, the dissociation proceeds with the subsequent oxidation to give mercury bromide. The mercury bromide formed here, in contrast to the process described in DE 102 33 173 B4, is bonded in a fixed manner in the activated carbon matrix and can be reliably separated out by means of the downstream dedusting unit.

In principle, reactants in a mixture with carbonaceous adsorbents can be contacted with the flue gas stream. The reactants can be added to the carbonaceous adsorbents by metered addition in the liquid phase or in the gas phase immediately before the introduction thereof into the flue gas stream. In this context, in situ doping of the adsorbents takes place. It is particularly advantageous when reactants are added to the conveying path an activated carbon metering unit, which achieves effective doping of the activated carbon and avoids possible streaks in the case of separate metered addition in the flue gas duct. Especially in the case of activated carbon metering, which is present in any case, this process can be performed with an exceptionally low level of retrofitting. The addition of the reactants to the conveying path of the activated carbon metering unit can be effected either beyond or upstream of an activated carbon addition in the flow direction of the carrier air/conveying air.

Alternatively, it is envisaged that the reactants, based on the flue gas flow, are introduced in the liquid phase or in the gas phase into the flue gas stream upstream or downstream of carbonaceous adsorbents introduced into the flue gas stream in the form of an entrained dust cloud. Examples of useful carbonaceous adsorbents include activated carbons and/or activated cokes. The carbonaceous adsorbents employed preferably hearth furnace cokes. For example, the hearth furnace coke employed may be a coke of the HOK brand name, which has been produced on the basis of brown coal. This hearth furnace coke has been acknowledged to have high adsorption performance.

The process according to the invention especially has the benefit compared to the known processes that the sulfur dioxide content in the offgas is uncritical for the process.

In any case, competing reactions of the reactants, especially of the bromine with other substances present in the offgas, are avoided by introducing the reactants to the gas stream in the immediately spatial proximity of the adsorbents. By virtue of a particularly favorable combination of reactive and adsorptive offgas cleaning, the process according to the invention is not reliant on a downstream wet scrubbing operation.

In a preferred variant of the process according to the invention, it is envisaged that the spatial distance between the addition of the reactants, especially of bromine and/or bromine compounds, and the addition of adsorbents, measured as the temperature difference of the flue gas stream, is <410° C. In other words, the spatial distance between the addition of reactants to the offgas stream beyond a firing operation is selected such that the flue gas stream between the addition of reactants and addition of adsorbents does not cool down by more than 410° C. At the same time, it is not ruled out in accordance with the invention that the cooling of the flue gas stream, for instance between the addition of the reactants and the addition of adsorbents, is effected using one or more heat exchangers.

The bromine compounds employed are preferably sodium bromide and/or calcium bromide and/or hydrogen bromide (HBr). A useful alkali metal sulfide is sodium tetrasulfide as a solution or in vaporous form.

An example of a useful alkali metal sulfide is sodium tetrasulfide ($Na_2S_4$) in liquid phase or in the gas phase.

The bromine and/or bromine compounds are introduced into the flue gas stream in liquid or gaseous form.

In an appropriate variant of the process according to the invention, the proportion of reactants in the total amount of adsorbents and reactants metered in may be between 3 and 14% by mass, preferably between 5 and 12% by mass.

The adsorbents employed may, for example, be all kinds of activated carbons and activated cokes, either individually or as a mixture. In a particularly preferred variant of the process, the carbonaceous adsorbents employed, as already mentioned above, are what are called hearth furnace cokes.

In the case of separate addition of the bromine and/or bromine compound, the introduction of sodium bromide or calcium bromide, preferably in liquid form through an injection into the flue gas stream, is effected beyond a firing operation, especially at a temperature of <500° C., and before a flue gas dedusting operation and any downstream flue gas desulfurizing operation. In the case of introduction of a liquid bromine compound, for example, calcium bromide ($CaBr_2$) or sodium bromide are useful as the bromine compound; in the case of gaseous addition, for example, hydrogen bromide (HBr) can be employed. Sodium tetrasulfide can be introduced into the flue gas stream, for example, in gaseous/vaporous form.

Downstream of the addition of the reactants, carbonaceous adsorbents are then introduced into the flue gas stream in the form of an entrained dust cloud, and the distance between the addition of the reactants on the one hand and of the carbonaceous adsorbents defines the reaction zone available in the flue gas stream over which, for example, bromination of the elemental mercury in the flue gas stream is effected. Preference is given to adding the reactants at temperatures of <500° C. and >250° C. The addition of the carbonaceous adsorbents in the form of an entrained dust cloud is effected at temperature ≤250° C. The separation of, for example, mercury bromide and excess bromine is effected by means of the carbonaceous adsorbents, which are isolated from the flue gas stream in a downstream dedusting unit. Useful dedusting units include the customary electrostatic filters, cloth filters etc.

In the above-described variant of separate addition of reactants, especially of bromine on the one hand and adsorbents on the other hand, the bromine injected into the offgas stream is already available in the gas phase for the oxidation of the mercury. In a further additional step, the mercury removal or deposition is effected over the activated carbon which has then been doped with the reactant in the gas pathway.

In the process according to the invention, at least in the case of separate addition of bromine and adsorbents or hearth furnace coke, in situ doping of the carbonaceous adsorbents is effected.

In the process according to the invention, the separate addition of calcium bromide or sodium bromide in the liquid phase or of hydrogen bromide in the gas phase is effected, in which case the carbonaceous adsorbents in the entrained dust cloud constitute crystallization seeds for the bromine compounds introduced into the flue gas stream.

As already mentioned at the outset, the carbonaceous adsorbents and the bromine compounds can also be introduced in a mixture into the flue gas stream. In this case, it is advisable and appropriate to introduce this mixture into the flue gas stream at temperatures of ≤250° C. In this case, for example, hearth furnace coke may be present in a mixture with sodium bromide or calcium bromide in liquid form or as a salt. According to the gas composition of the flue gas, metered addition of the adsorbents can be effected within the range from 20 mg to 300 mg based on one $m^3$ of flue gas, preferably between 50 mg and 150 mg of flue gas. The addition of sodium bromide or calcium bromide based on the bromine content in the mixture with the adsorbents is between 3 and 14% by mass, preferably between 5 and 10% by mass, depending on the mercury concentration in the offgas.

In the case of liquid metering of the reactants, the reactants are metered in with a maximum proportion of 10% by mass of the carbonaceous adsorbents introduced into the flue gas stream. The carbonaceous adsorbents can be metered into the flue gas stream, for example, in an amount between 20 and 300 mg of adsorbents per $m^3$ of gas volume flow rate to be cleaned. Preference is given to expending about 40 to 250 mg of carbonaceous adsorbents per $m^3$ of gas volume to be cleaned.

In a particularly preferred variant of the process according to the invention, the metered addition of the reactants is regulated as a function of a preset limiting mercury concentration as the target value, the regulation being performed with constant measurement of the mercury concentration in the flue gas stream as the actual value.

The process according to the invention is illustrated schematically hereinafter by two working examples with reference to the process schemes appended, of which FIG. 1 shows a schematic diagram of the process sequence in a first variant of the process according to the invention and FIG. 2 a schematic diagram of the process scheme in a second variant of the process according to the invention.

Reference numeral 1 in FIG. 1 denotes, in schematic form, a flue gas duct leading to a chimney, which is not shown. Provided in the flue gas duct 1 is a dedusting unit 2, for example in the form of a cloth filter. Through an injection line 3, a mixture of adsorbents and reactants is introduced into the flue gas duct 1. The carrier medium used for the adsorbents and the reactants is ambient air, which is introduced by means of a blower 4 in the injection line 3. The air is supplied via a vaporizer feed 5 to an electrically heated vaporizer 6 for the reactants to be metered in. Instead of the vaporizer 6, an electrically heated mixing chamber may be provided, in which atomization and/or nebulization of the reactants is provided. This gives rise to particularly fine and homogeneous nebulization in the conveying gas stream.

The vaporous/gaseous reactants are introduced into the injection line 3 via the vaporizer return 7. The injection line 3 opens into an injector 8 into which hearth furnace coke dust is metered from a reservoir vessel 9 via a star feeder 10. The injector 8 introduces the mixture of reactants and hearth furnace coke into the flue gas duct 1. The mixture is introduced into the flue gas duct 1 in the form of an entrained dust cloud. After appropriate loading with mercury, the adsorbents are isolated again from the flue gas duct 1 by means of the dedusting unit 2. Beyond the dedusting unit 2, there is constant mercury measurement in the flue gas. The correspondingly processed measurement signal is sent to a regulator 11 which in turn controls a metering pump 12. The metering pump 12 conveys reactants in liquid or the reactants in solution from a reservoir vessel 13 for the substance being metered into the vaporizer 6.

The connection shown in the figures is envisaged especially for retrofitting of an existing entrained flow adsorption plant. For this reason, barrier valves 14 are provided both in the vaporizer feed 5 and in the vaporizer return 6, and also in the injection line 3 between vaporizer feed 5 and vaporizer return 6. The blower 4 introduces atmospheric air via the injection line 3 into the injector 8, in which hearth furnace coke dust is metered in. If, in addition to the carbonaceous adsorbent, reactants, for example in the form of bromine compounds or alkali metal sulfides, are to be metered in to the flue gas duct 1, the barrier valve 14 between vaporizer feed 5 and vaporizer return 7 is closed, but the barrier valves 14 in the vaporizer feed 5 and in the vaporizer return 7 are opened, such that reactants in vaporous/gaseous form are introduced into the injection line 3 upstream of the injector 8.

Figure 2:
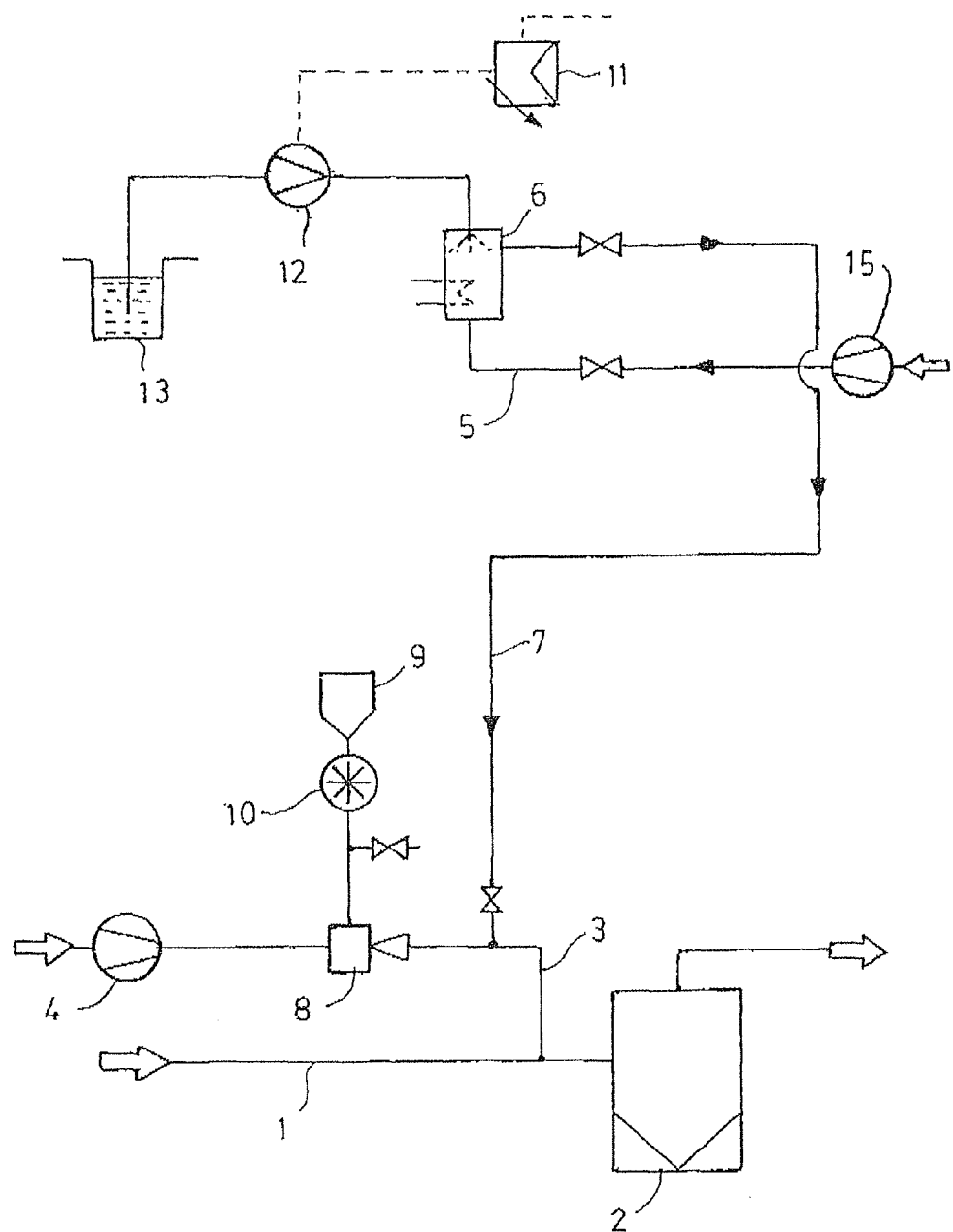

In the working example shown in FIG. 2, identical components are given the same reference numerals. This working example differs from the working example shown in FIG. 1 in that the reactants are metered into the injection line 3 beyond the injector 8 in flow direction. In this case, a further blower 15 is provided, by means of which ambient air/atmospheric air is introduced into the vaporizer feed 5. In this case, the vaporizer feed 5 is not connected to the injection line 3.

This variant has the particular benefit that there is no need to conduct the entire conveying air stream for the activated carbon through the vaporizer or a mixing chamber. Instead, only a portion of the air is supplied to the vaporizer 6 via the separate blower 15, such that the dimensions of the blower 15 can be correspondingly small. This variant of the metered addition of the reactants into the conveying path of the activated carbon metering unit beyond the injector 8 is advantageous especially for retrofitting of existing plants with very low apparatus complexity.

LIST OF REFERENCE NUMERALS

1 Flue gas duct
2 Dedusting unit

3 Injection line
4 Blower
5 Vaporizer feed
6, 7 Vaporizer return
8 Injector
9 Reservoir vessel
10 Star feeder
11 Regulator
12 Metering pump
13 Reservoir vessel for substance being metered
14 Barrier valves
15 Blower

What is claimed is:

1. A process for separating mercury out of flue gases from high-temperature plants, especially from power plants and waste incineration plants, in which bromine and/or bromine compounds and/or alkali metal sulfides are added as reactants to the flue gas beyond the firing operation in flow direction, and then the flue gas is subjected to at least one dry cleaning operation to remove the mercury and any excess reactants, characterized in that the reactants and carbonaceous adsorbents, in the form of activated carbons and/or activated cokes, are introduced into the flue gas stream by separate metered addition, and in that the reactants are metered into the flue gas stream as a function of a constantly measured mercury concentration in the flue gas.

2. The process as claimed in claim 1, characterized in that the reactants are contacted with the flue gas at a flue gas temperature between 80° C. and 490° C.

3. The process as claimed in claim 1, characterized in that the reactants are contacted with the flue gas stream in a mixture with carbonaceous adsorbents.

4. The process as claimed in claim 1, characterized in that the reactants in the liquid phase or in the gas phase are introduced into the flue gas stream upstream or downstream, based on the flue gas flow, of carbonaceous adsorbents introduced into the flue gas stream in the form of an entrained dust cloud.

5. The process as claimed in claim 4, characterized in that the spatial distance between the addition of reactants and the addition of adsorbents, measured as the temperature difference of the flue gas stream, is ≤410° C.

6. The process as claimed in claim 1, characterized in that the bromine compounds employed are sodium bromide and/or hydrogen bromide and/or calcium bromide.

7. The process as claimed in claim 1, characterized in that the alkali metal sulfide employed is sodium tetrasulfide.

8. The process as claimed in claim 1, characterized in that the reactants are introduced into the flue gas stream in liquid or gaseous form.

9. The process as claimed in claim 1, characterized in that the proportion of reactants in the total amount of adsorbents and reactants metered in is between 3 and 14% by mass.

10. The process as claimed in claim 1, characterized in that the metered addition is regulated as a function of a predefined limiting mercury concentration in the flue gas as a target value.

11. The process as claimed in claim 3, characterized in that the reactants are added to the conveying pathway a metering device for activated carbons and/or activated cokes.

12. The process as claimed in claim 2, characterized in that the flue gas temperature is between 80° C. and 250° C.

13. The process as claimed in claim 3, characterized in that the carbonaceous adsorbents are activated carbons and/or activated cokes.

14. The process as claimed in claim 9, characterized in that the proportion of reactants in the total amount of adsorbents and reactants metered in is between 5 and 12% by mass.

* * * * *